US008240783B2

(12) United States Patent
Johnson et al.

(10) Patent No.: US 8,240,783 B2
(45) Date of Patent: Aug. 14, 2012

(54) TRACK TENSIONING SYSTEM

(75) Inventors: Levi M. Johnson, Covington, OK (US); David A. Rorabaugh, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 315 days.

(21) Appl. No.: 12/534,694

(22) Filed: Aug. 3, 2009

(65) Prior Publication Data
US 2010/0194188 A1 Aug. 5, 2010

Related U.S. Application Data

(60) Provisional application No. 61/085,636, filed on Aug. 1, 2008.

(51) Int. Cl.
*B62D 55/14* (2006.01)
(52) U.S. Cl. .................. 305/141; 305/195; 305/154
(58) Field of Classification Search .................. 305/135, 305/141, 143, 150, 153–154, 195, 199
See application file for complete search history.

(56) References Cited

U.S. PATENT DOCUMENTS

| 112,460 | A | * | 3/1871 | Leavitt | 362/316 |
|---|---|---|---|---|---|
| 1,112,460 | A | * | 10/1914 | Leavitt | 180/9.5 |
| 3,241,889 | A | * | 3/1966 | Borisov et al. | 305/154 |
| 3,736,032 | A | * | 5/1973 | Mosshart et al. | 305/34 |
| 3,768,878 | A | * | 10/1973 | Garman | 305/154 |
| 5,246,246 | A | * | 9/1993 | Kendall | 280/677 |
| 5,316,381 | A | | 5/1994 | Isaacson et al. | |
| 5,409,305 | A | | 4/1995 | Nagorcka | |
| 5,622,234 | A | | 4/1997 | Nagorcka et al. | |
| 5,829,848 | A | * | 11/1998 | Kelderman | 305/15 |
| 6,062,327 | A | * | 5/2000 | Ketting et al. | 180/9.52 |
| 6,318,484 | B2 | * | 11/2001 | Lykken et al. | 180/9.48 |
| 6,557,953 | B1 | * | 5/2003 | Kahle et al. | 305/135 |
| 7,083,241 | B2 | | 8/2006 | Gunter | |
| 7,222,924 | B2 | | 5/2007 | Christianson | |
| 7,255,184 | B2 | * | 8/2007 | Loegering et al. | 180/9.26 |
| 7,997,666 | B2 | * | 8/2011 | Bordini | 305/150 |
| 2004/0045747 | A1 | | 3/2004 | Albright et al. | |
| 2004/0119336 | A1 | | 6/2004 | Lussier | |

FOREIGN PATENT DOCUMENTS

| JP | 55-39837 A | * 3/1980 | 305/141 |
|---|---|---|---|
| JP | 10-218046 A | 8/1998 | |
| WO | 2005-113322 A1 | 12/2005 | |

* cited by examiner

*Primary Examiner* — Jason Bellinger
(74) *Attorney, Agent, or Firm* — Tomlinson Rust McKinstry Grable

(57) ABSTRACT

A tensioning system for a tracked vehicle. The present invention provides for adjusting tension of a track by moving the sprocket relative to the rollers in a substantially vertical direction. The system comprises a sprocket assembly, a roller assembly, a track, and a tension adjustment assembly. The tension adjustment assembly includes a tension bolt threaded through a tension nut that is secured to the sprocket assembly. The bolt threads through the nut and contacts the roller assembly. As the bolt is threaded or unthreaded, the sprocket assembly is moved relative to the roller assembly in a substantially vertical direction. As the assemblies move relative to each other, tension in the track is resultantly adjusted.

10 Claims, 14 Drawing Sheets

TRACK TENSIONING SYSTEM

CROSS REFERENCE TO RELATED APPLICATIONS

This application claims the benefit of U.S. Provisional Application No. 61/085,636 filed Aug. 1, 2008, the contents of which are incorporated fully herein by reference.

FIELD OF THE INVENTION

The present invention relates to the tracks for construction vehicles and more particularly to alternative antenna cores for use in locating and tracking equipment.

SUMMARY OF THE INVENTION

The present invention is directed to track system for a tracked vehicle, the system comprising a sprocket assembly, a roller assembly, a track, and a tension adjustment assembly adapted to move the sprocket assembly relative to the roller assembly in a substantially vertical direction. The sprocket assembly comprises a bearing assembly and a sprocket rotatably attached to the bearing assembly. The roller assembly comprises a roller trolley and a plurality of rollers rotatably supported on the trolley. The track is disposed around the sprocket and the plurality of rollers.

In a preferred embodiment, the tension adjustment assembly comprises a tension base plate secured to the roller support of the roller assembly, a tension adjustor plate, an adjustment nut secured to a top of the adjustor plate, an adjustment bolt adapted to be threaded through the adjustment nut such that a threaded end of the bolt contacts the tension base plate, and at, least one clamping bolt adapted to secure the roller support to the adjustor plate.

In an alternative embodiment, the tension adjustment assembly comprises a hub secured to the bearing assembly, an adjustment nut secured to a top of the hub, a tension adjustor plate positioned adjacent the hub and in contact with a roller support of the roller assembly, an adjustment bolt adapted to be threaded through the adjustment nut such that a threaded end of the bolt contacts the tension adjustor plate, and at least one clamping bolt adapted to secure the hub to the adjustor plate.

In yet another embodiment, the adjustment assembly comprises a first plate secured to the bearing assembly, an adjustment nut secured to a top of the plate and adjacent the bearing assembly, and an adjustment bolt adapted to be threaded through the adjustment nut such that a threaded end of the bolt contacts a frame of the roller trolley. The first plate is pivotally secured to the frame at a pivot point adjacent the bearing assembly and opposite from the adjustment nut.

In an alternative embodiment, the present invention is directed to a track system for a tracked vehicle. The system comprises sprocket assembly comprising a rotatable sprocket, a roller assembly, a track disposed around the sprocket and the plurality of rollers, and a tension adjustment assembly adapted to move the sprocket assembly relative to the roller assembly in a substantially vertical direction. The roller assembly comprises a frame and a plurality of rollers rotatably supported on the frame.

In yet another embodiment the present invention is directed to a method for adjusting tension in a track of a tracked vehicle. The method comprises the steps of moving a sprocket in a substantially vertical direction relative to a plurality of rollers, and securing the sprocket relative to the rollers. The step of moving the sprocket may comprise threading a bolt through a nut secured to the sprocket such that a threaded end of the bolt contacts the rollers. The step of securing the sprocket may comprise clamping the sprocket relative to the rollers.

BRIEF DESCRIPTION OF THE DRAWINGS

FIG. 6 is a partial perspective view of the alternative embodiment shown in

FIG. 5 without the outside roller support.

DETAILED DESCRIPTION OF THE INVENTION

Tracks are often used in ground drive systems for construction and other vehicles. Endless tracks are generally driven by a motor and sprocket or drive wheel combination Rollers of various forms and sites are used to support the tracks. Tensioning devices and systems are used to maintain tension in the tracks around rollers, sprockets and drive wheels. Springs or hydraulic cylinders have traditionally been used to maintain tension on tracks.

The present invention relates to a tensioning system for use with a track system on tracked vehicle such compact utility equipment or construction machines. The system uses a roller trolley and vertical tensioning system. The invention is particularly useful for tracks with a small footprint, where space for traditional horizontal tensioning is limited. However, the system may also be used for larger track systems or other equipment.

Figure 1:
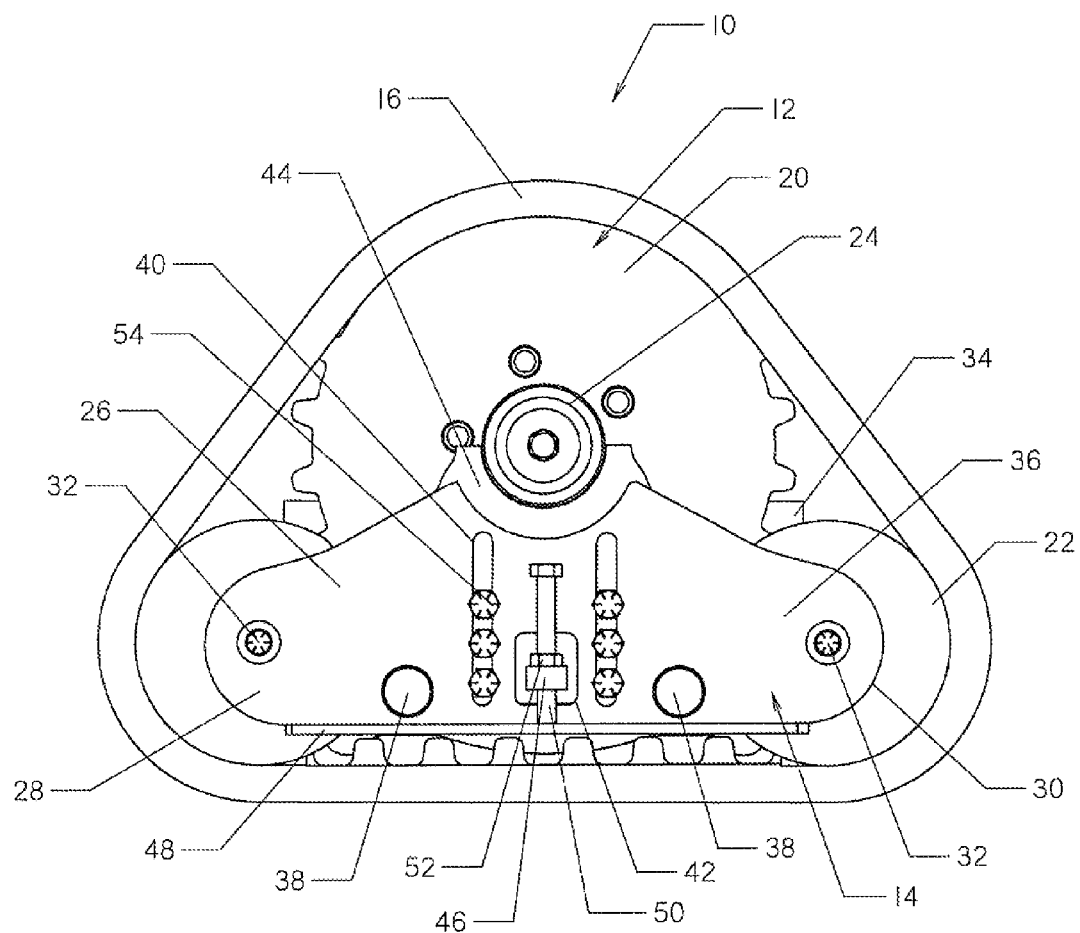
FIG. 1 is a plan view of a track system having a track tensioning assembly constructed in accordance with the present invention.

With reference now to the drawings in general and to FIG. 1 in particular, there is shown therein a preferred embodiment for a track system for a construction vehicle constructed in accordance with the present invention. The track system, designated by reference number 10, comprises a sprocket assembly 12, a roller assembly 14 a track 16, and a tension adjustment assembly 18. The sprocket assembly 12 comprises a vertically disposed drive sprocket 20 generally provided for rotational movement. The sprocket 20 is driven by a motor and axle (not shown) that are part of the construction vehicle. The roller assembly 14 comprises a plurality of rollers 22 adapted to rotate freely. Preferably, a center point of the sprocket 20 is positioned between and above a center point of the rollers 22. The track 16 passes around the sprocket 20 and the rollers 22, forming a generally triangular shape when viewed from the side.

Figure 2:
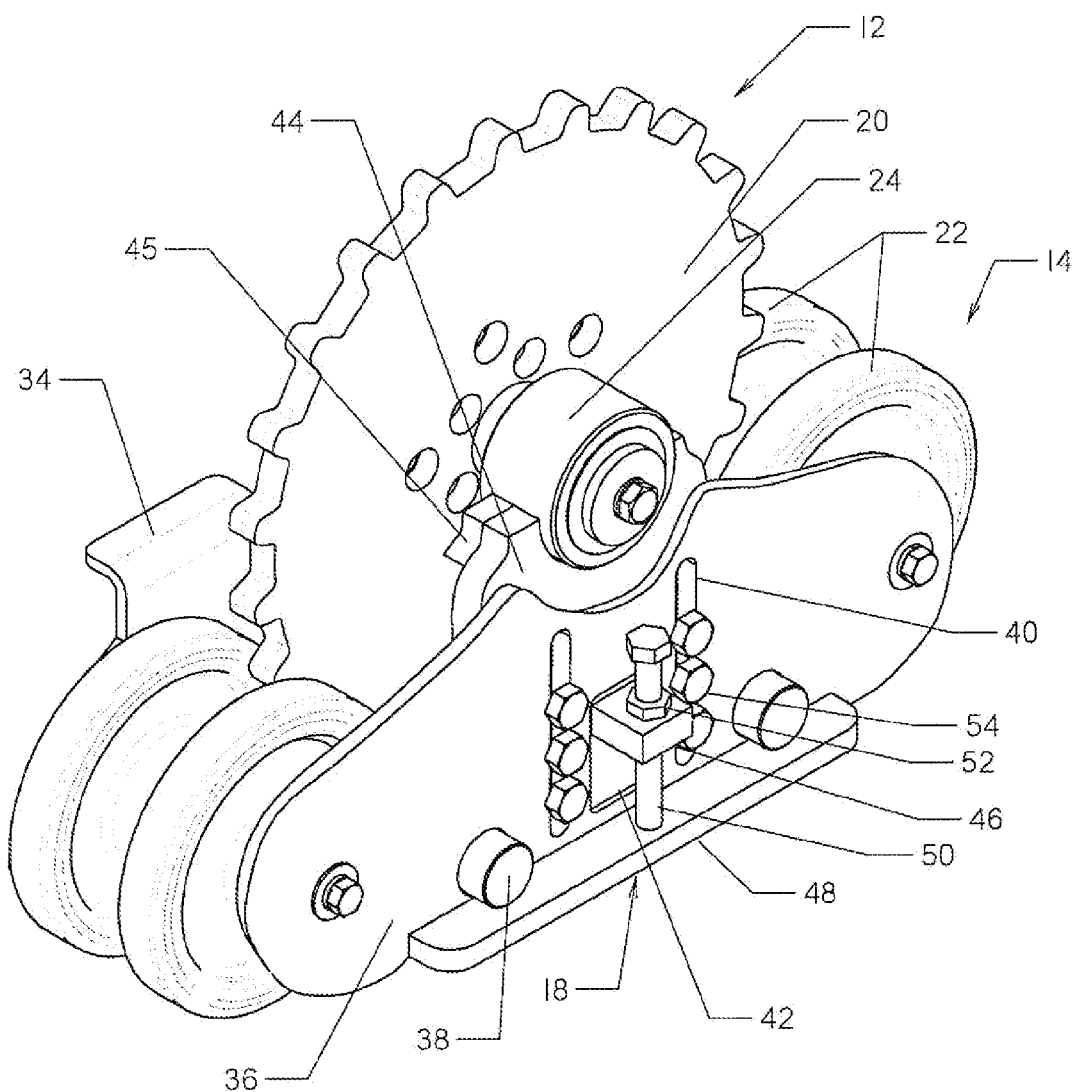
FIG. 2 is a perspective view of the system shown in FIG. 1.

Turning to FIG. 2, the sprocket assembly 12 will be described in additional detail. he assembly 12 further comprises a bearing carrier 24. The bearing carrier 24 is disposed at the center of the sprocket 20 and allows the sprocket to rotate. The carrier 24 provides support for the axle (not shown) coming from the construction equipment or other vehicle that will rotate the sprocket 20.

With continued reference to FIG. 2, the roller assembly 14 comprises a roller trolley 26 having a first end 28 and a second end 30. Axles 32 are preferably disposed at the, ends 28 and 30 of the trolley 26 to rotatably support the rollers 22. Additional rollers may also be disposed along a length of the trolley 26. Preferably, the trolley 26 comprises a vertical inside roller support plate 34 and a vertical outside roller support plate 36. The support plates 34 and 36 may be connected by one or more stabilizing bars 38, or alternatively by cross supports disposed between the rollers 22. The inside support plate 34 may also be secured to a frame of the construction machine. The outside support plate 36 preferably defines a plurality of slots 40 and 42 for use in connection with the tension adjustment assembly 18. More preferably, the plate 36 will define two clamping slots 40 and a tension nut slot 42 as will be further described below.

The tension adjustment assembly 18 is provided to move the sprocket assembly 12 relative to the roller assembly 14 in a vertical direction, thus adjusting a tension level in the track 16. The tension, assembly 18 comprises a tension adjustor plate 44 secured to the bearing carrier 24. The tension adjustor plate 44 is attached to the bearing carrier 24 such that it is parallel to the sprocket 20 and positioned between the sprocket and the outside roller support 36. A gusset 45 may be used to assist in supporting the plate 44. An adjustment nut 46 is attached to tension adjustor plate 44. The adjustment nut 46 is secured, such as by welding, to a surface of the tension adjustor plate 44. The nut 46 is positioned such that it is aligned with and fits through the tension nut slot 42 of the outer support plate 36.

The tensioning assembly 18 also comprises a tension base plate 48 secured to the outer support plate 36. As shown in FIGS. 1 and 2, the tension base plate 48 is welded to a bottom portion of the outer support plate 36, below the tension nut slot 42 and the adjustment nut 46. An adjustment bolt 50 is threaded through the adjustment nut 46 such that it is seated against the tension base plate 48. Threading the bolt 50 through the nut 46 while the bolt is seated against the base plate 48 allows for the nut, and consequently the adjustor plate 44 and sprocket 20, to be moved vertically relative to the trolley 26. As the sprocket 20 is moved vertically relative to the trolley 26, tension on the track 16 that surrounds the sprocket and rollers 22 is adjusted.

When the desired tension of the track 16 is achieved by adjusting the relative position of the sprocket 20 and the trolley 26, the position may further be secured using a jam nut locking nut 52 and a plurality of clamping bolts 54. The locking nut 52 is an additional nut threaded on the adjustment bolt 50 and tightened against the adjustment nut 46. The clamping bolts 54 pass through the clamping slots 40 in the outer support plate 36 and secure to internally threaded bores provided in the tension adjustor plate 44.

Figure 3:
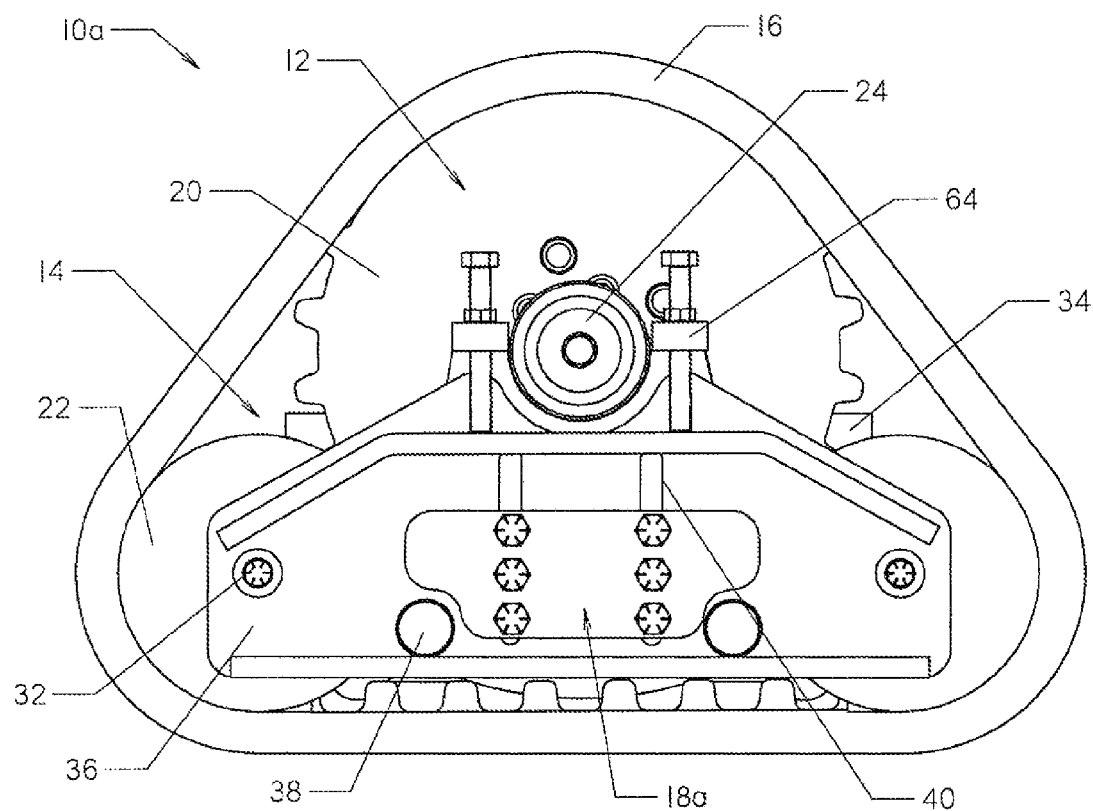
FIG. 3 is a plan view of an alternative embodiment for a track tensioning assembly for use with the system in FIG. 1.

With reference now to FIG. 3, there is shown therein an alternative embodiment for the tensioning assembly of FIGS. 1 and 2. The system 10a shown in FIG. 3 again comprises the sprocket assembly 12, the roller assembly 14, and the track 16. The sprocket assembly 12 comprises the sprocket 20 and bearing carrier 24. The roller assembly 14 includes the inside roller support 34 and outside roller support 36 connected by stabilizing bars 38. The rollers 22 rotate freely on axles 32 supported by the supports 34 and 36.

Figure 4:
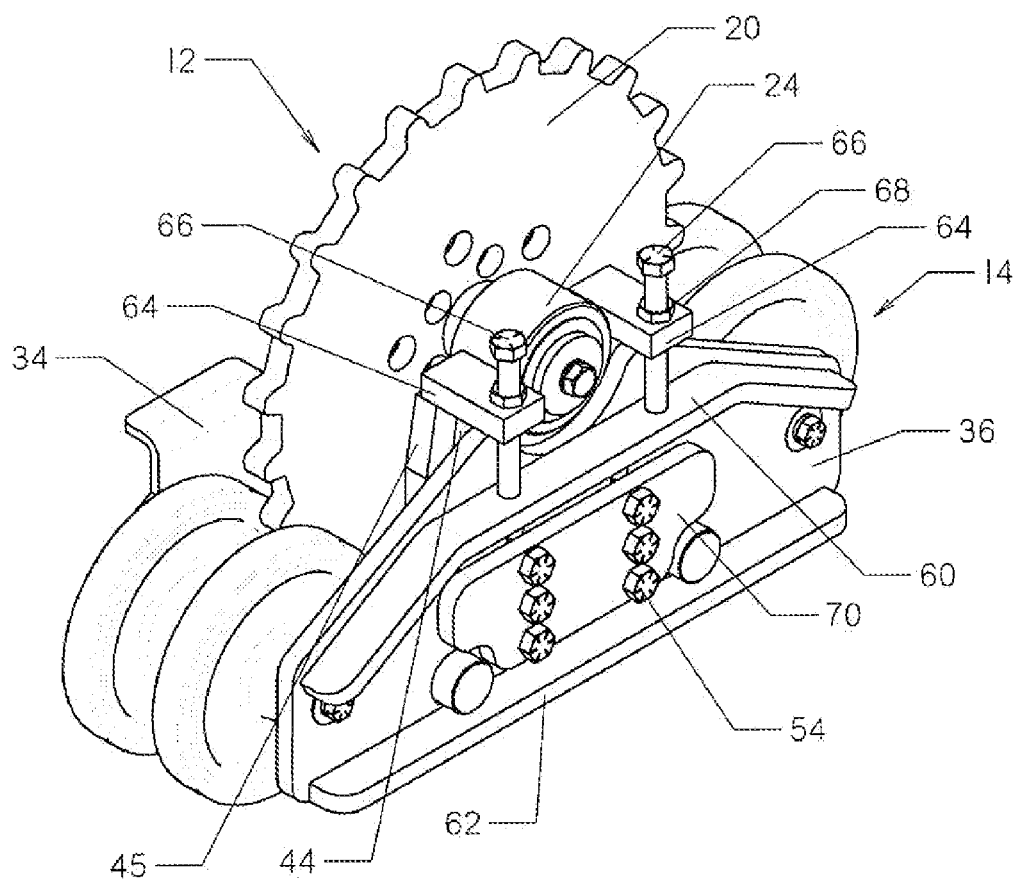
FIG. 4 is a partial perspective view of the alternative embodiment shown in FIG. 3 without the track.

The tensioning assembly 18a of FIG. 3 similarly functions to adjust the relative vertical positions of the sprocket assembly 12 and the roller assembly 14. Referring now to FIG. 4, the tensioning assembly 18a again comprises the tension adjustor plate 44 and gusset 45 secured to the bearing carrier 24. In the embodiment of FIGS. 3 and 4, the tensioning assembly 18a comprises a tension base 60 secured to an upper portion of the outside roller support 36 of the roller assembly 14. One skilled in the art will appreciate the tension base 60 may also serve to function as a support structure for the outside roller support 36. Other support structures, such as support 62 along a base of the roller support 36, may also be advantageous.

Figure 5:
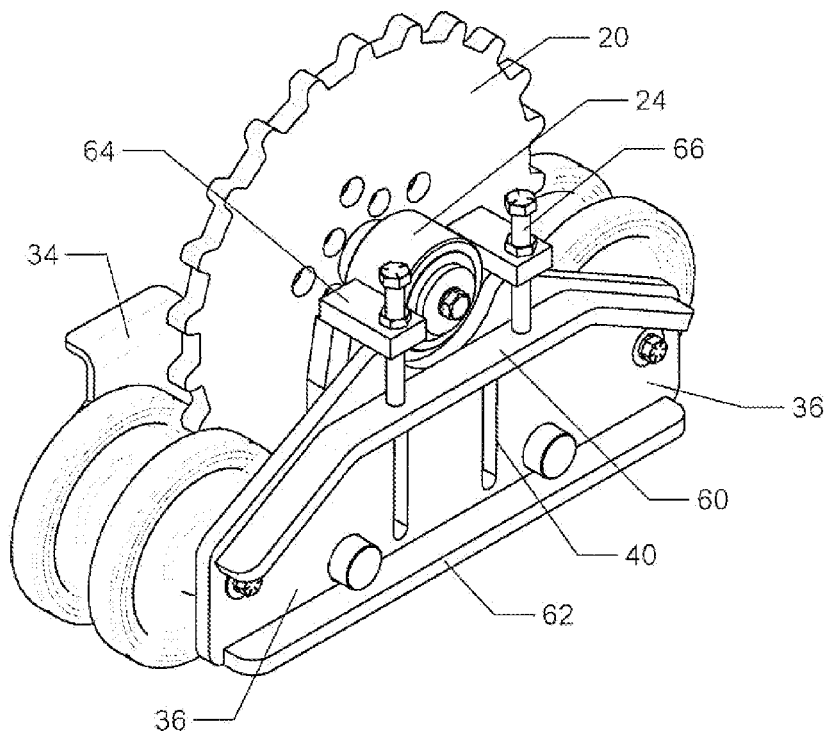
FIG. 5 is a partial perspective view of the alternative embodiment shown in FIG. 4 without the clamping assembly.
Figure 6:
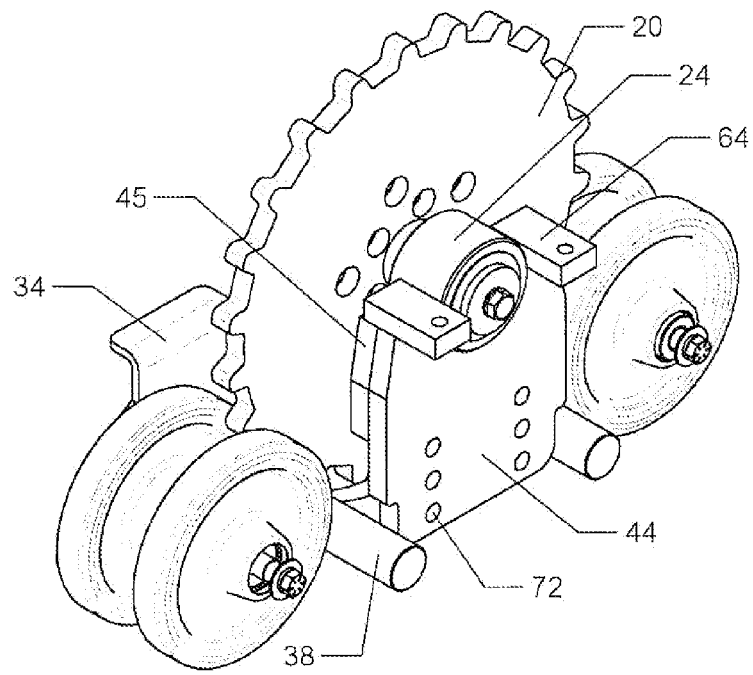

With continued reference to FIG. 3, the tensioning assembly 18a comprises a plurality of adjustment nuts 64. The adjustment nuts 64 are secured to a top of the plate 44 and the gusset 45, on opposite sides of the bearing carrier 24. A plurality of adjustment bolts 66 are threaded through the nuts 64 and seated against the tension base 60. The bolts 66 can be adjusted to move the plate 44, and consequently the sprocket 20, vertically relative to the roller support 36, and consequently the rollers 22. The relative position of the sprocket 20 and the rollers 22 can be secured using locking nuts 68 on the bolts 66 and tightened against the adjustment nuts 64. Additionally, a sandwich clamping plate 70 can be used to secure the roller support 36 to the tension plate 44. The sandwich plate 70 is placed on an outside surface of the roller support 36 and secured with the clamping bolts 54. The bolts 54 pass through the slots 40 (as shown in FIG. 5) in the roller support 36 and thread into bores 72 (shown in FIG. 6) on the tension plate 44. The sandwich plate 70 and clamping bolts 54 function to secure the roller assembly 14 to the sprocket assembly 12 in the desired tensioning position. If tension on the track 16 needs to be adjusted, the clamping bolts 54 can be loosened and the tension adjustment bolts 66 can be adjusted until tension on the track is as desired.

Figure 7:
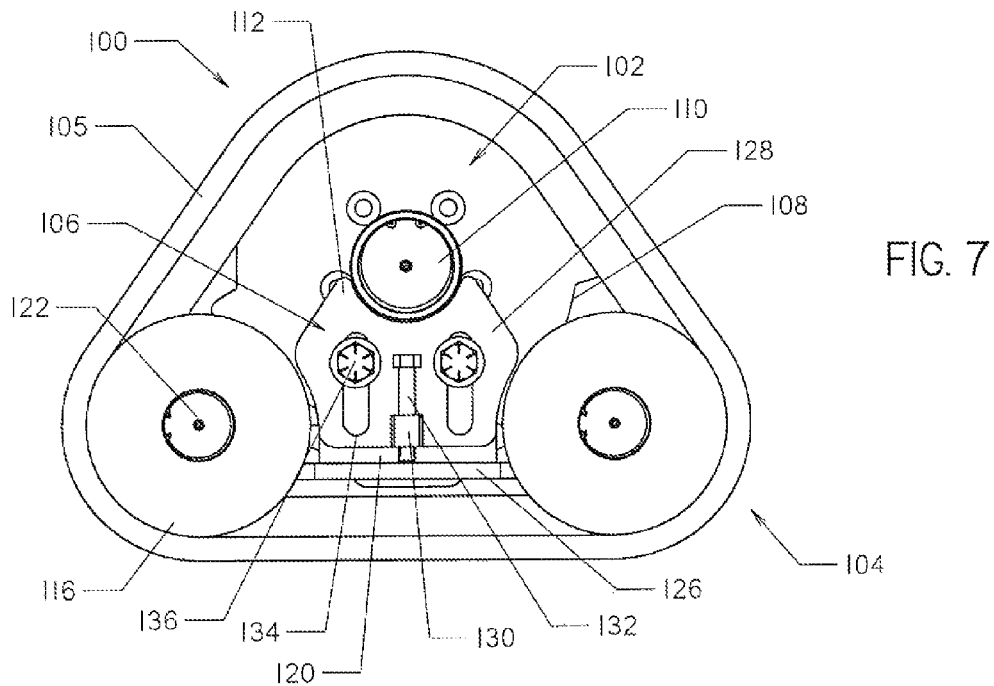
FIG. 7 is a plan view of an alternative embodiment for a track system generally for use on smaller tracked vehicles.
Figure 8:
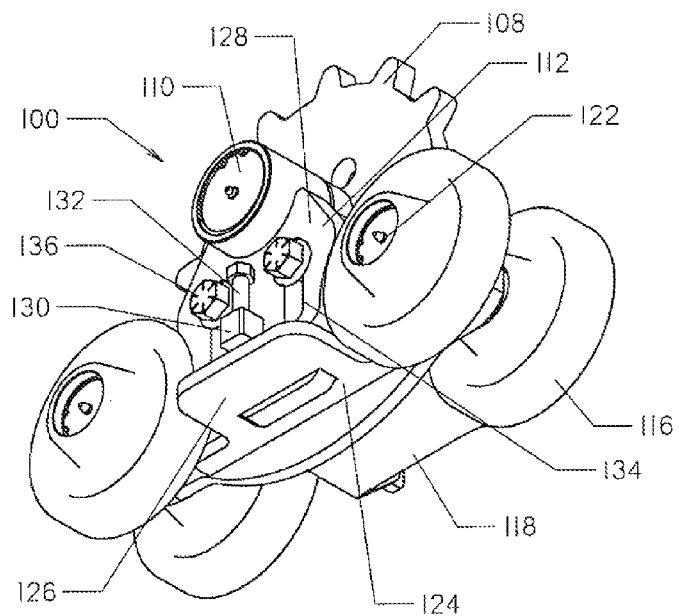
FIG. 8 is a partial perspective view of the alternative embodiment shown in FIG. 7 without the track.

Turning now to FIGS. 7 and 8, shown therein is an alternative embodiment track system 100 for use with smaller tracks and smaller machines. As with the embodiment from FIGS. 1 and 3, the track system 100 shown in FIG. 7 comprises a sprocket assembly 102, a roller assembly 104, a track 105, and a tension adjustment assembly 106. The sprocket assembly 102 has a sprocket 108 and a bearing carrier 110. The roller assembly 104 comprises a roller trolley 112 for supporting a plurality of rollers 116. The trolley 112 comprises an inner support plate 118 and an outer support plate 120 disposed on either side of the sprocket 108. The rollers 116 are preferably secured to the plates 118 and 120 at opposite ends of the plates by axles 122 that allow for free rotation. A cross support assembly 124 provides a connection between the support plates 118 and 120. The cross support assembly 124 comprises a tension base flange 126 for use with the tension adjustment assembly 106.

The tension adjustment assembly 106 comprises an adjuster plate 128 and a threaded tension nut 130. The plate 128 is secured to the bearing carrier 110 on a side of the support plate 120 opposite the sprocket 108. The tension nut 130 is secured to lower portion of the adjuster plate 128. A tension bolt 132 is threaded through the nut 130 such that the bolt contacts the tension base flange 126 of the roller assembly 104. The bolt 132 can be used to selectively adjust the vertical position of the bearing carrier 110 relative to the outer support plate 120. One skilled in the art will appreciate the adjustment of the bolt 132 will allow tension in the track 105 to be changed.

When desired tension is achieved, the adjuster plate 128 can be further secured to the support plate 120 of the roller assembly 104. Preferably, the adjuster plate 128 defines a plurality of vertically disposed clamping slots 134 and the support plate 120 will contain a corresponding number of internally threaded bores (not shown). A plurality of clamping bolts 136 are threaded through the slots 134 and into the outer support plate 120. Preferably, the two clamping bolts 136 are present.

Figure 9:
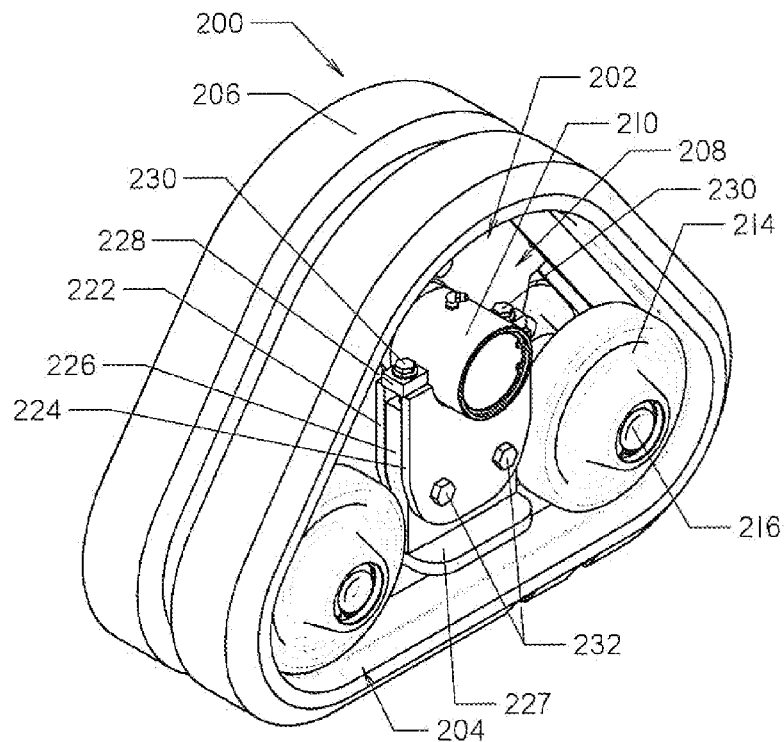
FIG. 9 is a side perspective view of an alternative embodiment for a track tensioning assembly for use with the system in FIG. 7.
Figure 10:
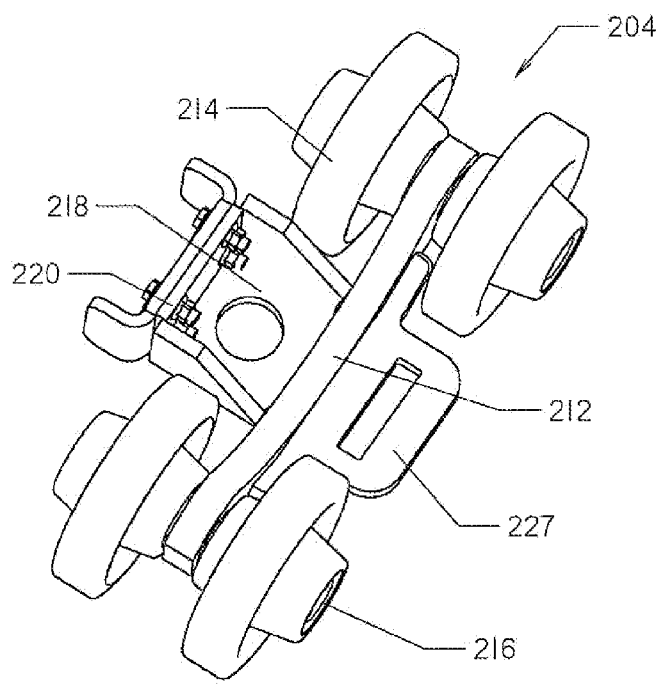
FIG. 10 is a perspective view of the roller trolley for use with the system of FIG. 9.

With reference now to FIG. 9, there is shown therein an alternative embodiment for a track system 200 with vertical track tensioning. The system 200 comprises a sprocket assembly 202, a roller assembly 204, a track 206, and a tension adjustment assembly 208. The sprocket assembly 202 comprises a sprocket 209 and a bearing carrier 210. As with previous embodiments, the bearing carrier 210 allows for the sprocket 208 to be rotated by a motor and axle from the construction vehicle (not shown). Shown in FIG. 10, the roller assembly 204 comprises a roller trolley 212 supporting a plurality of rollers 214. The rollers 214 are supported on the trolley 212 by axles 216 that allow the rollers to rotate freely. A support channel 218 and track stop 220 allow for connection to the machine frame (not shown) and controlled movement of the track system 200.

Referring again to FIG. 9, the tension adjustment assembly 208 again functions to adjust the relative vertical positions of the sprocket assembly 202 and the roller assembly 204. The tensioning assembly 208 comprises a first adjustor hub 222 and a second adjustor hub 224 secured to the bearing carrier 210. Preferably, the hubs 222 and 224 are horizontally separated by a gap sufficient to allow for slidably receiving an adjustment plate 226. A bottom portion of the adjustment plate 226 is in contact with and supported by an adjustment plate mount 227. The adjustment plate mount 227 comprises a flange or other support on an outer side of the trolley 212. The adjustment plate 226 may also be secured to adjustment plate mount 227.

The tensioning assembly 208 further comprises a plurality of adjustment nuts 228. Preferably, two adjustment nuts 228 are used on opposite sides of the bearing carrier 210. The nuts 228 are secured to the top of the hubs 222 and 224 such that a threaded hole in the nuts bridges the gap between the hubs. A plurality of tension bolts 230 are threaded through each of the nuts 228 such that a bottom of the bolt contacts the adjustment plate 226. One skilled in the art will appreciate the bolts 230 can be adjusted to move the plate 226, and consequently the trolley 212, vertically relative to the sprocket 209.

The movement of the sprocket 209 relative to the rollers 214 will allow the tension in the track 206 to be selectively adjusted.

Figure 11:
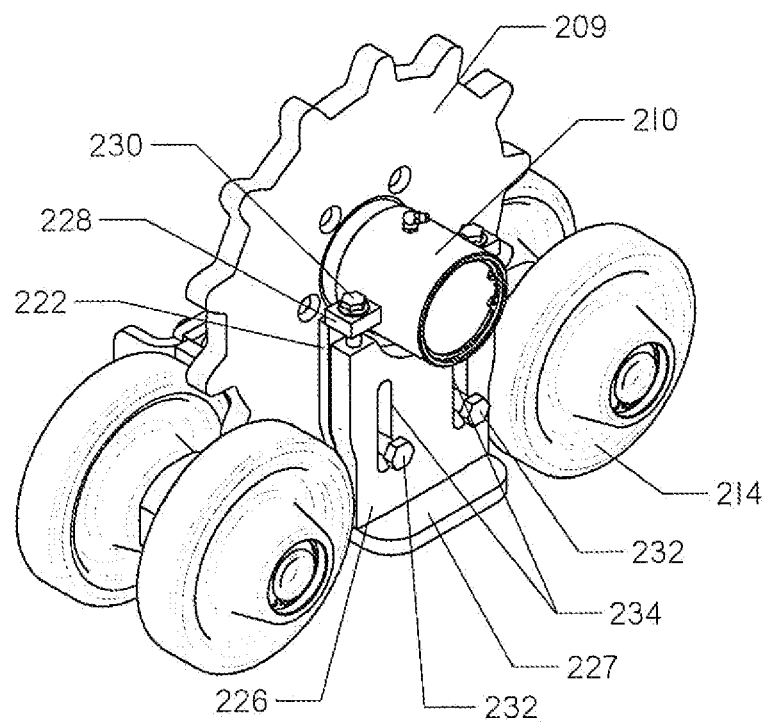
FIG. 11 is a partial perspective view of the alternative embodiment shown in FIG. 9 without the track or outside hub.
Figure 12:
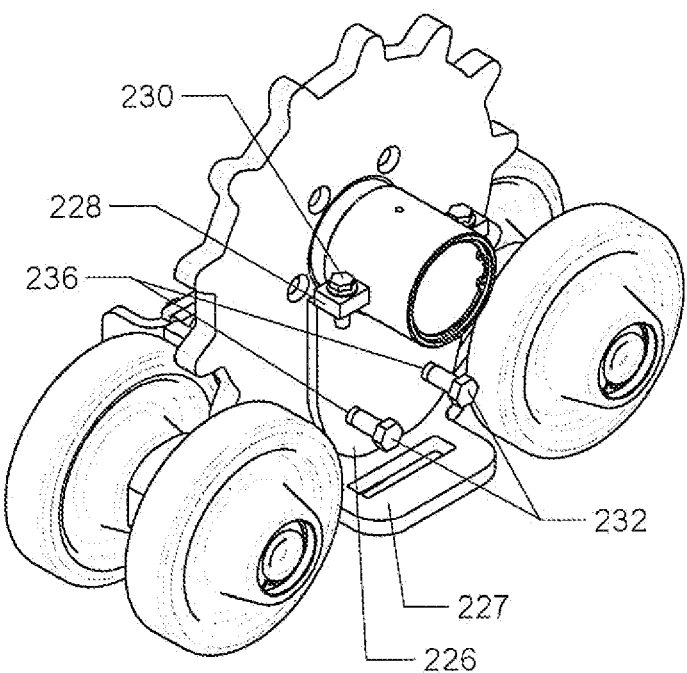
FIG. 12 is a partial perspective view of the alternative embodiment shown in FIG. 11 without the tension adjustor plate.

The relative position of the sprocket 209 and the rollers 214 on the trolley 212 can be secured using a plurality of clamping bolts 232. Preferably, two bolts 232 are used. The bolts 232 are through the second hub 224 and through vertical clamping slots 234 (as shown on FIG. 11) on the adjustment plate 226. The clamping bolts 232 are secured to internally threaded bores 236 (as shown in FIG. 12) on the first hub 222. If tension on the track 206 needs to be adjusted, the clamping bolts 232 can be loosened and the tension adjustment bolts 230 can be adjusted until tension on the track is as desired.

Figure 13:
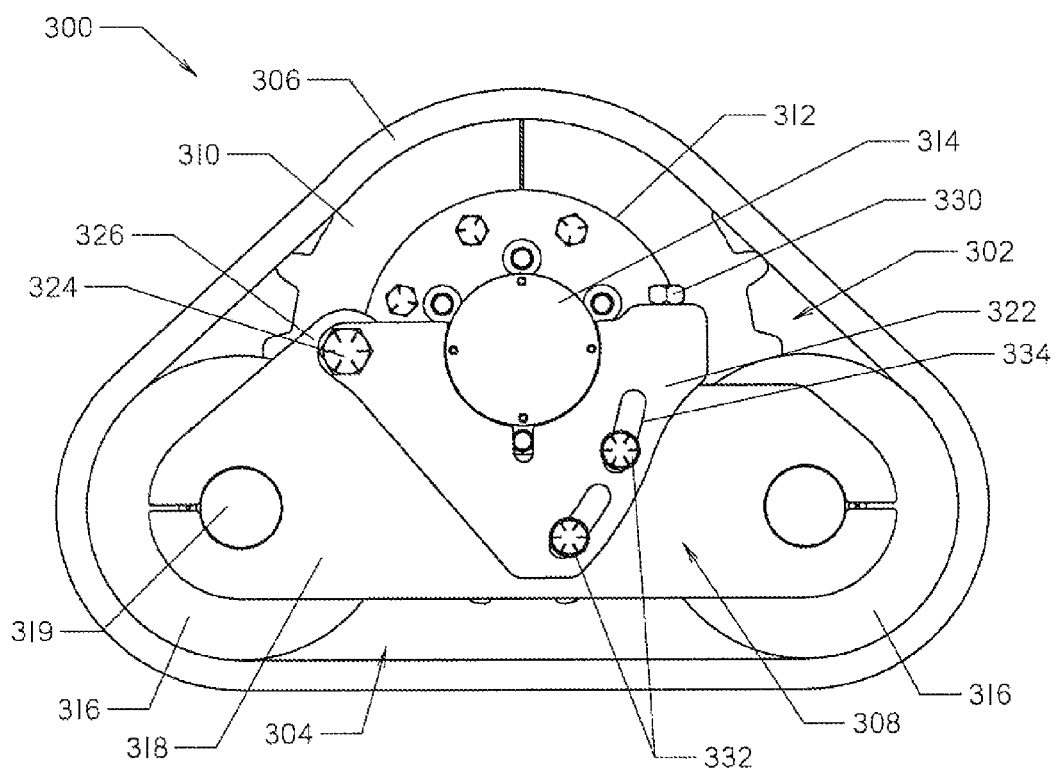
FIG. 13 is a plan view of an alternative embodiment for a track system having a tensioning assembly built in accordance with the present invention.

Turning now to FIG. 13, there is shown therein an alternative embodiment for a track system having a tensioning assembly built in accordance with the present invention. The system 300 of FIG. 13 comprises a sprocket assembly 302, a roller assembly 304, a track 306, and a tension adjustment assembly 308. The track 306 is disposed around the sprocket assembly 302 and the roller assembly 304 in a generally triangular shape. The tension adjustment assembly 308 serves to move the sprocket assembly 302 substantially vertically relative to the roller assembly 304, effectively adjusting a level of tension in the track 306.

Figure 14:
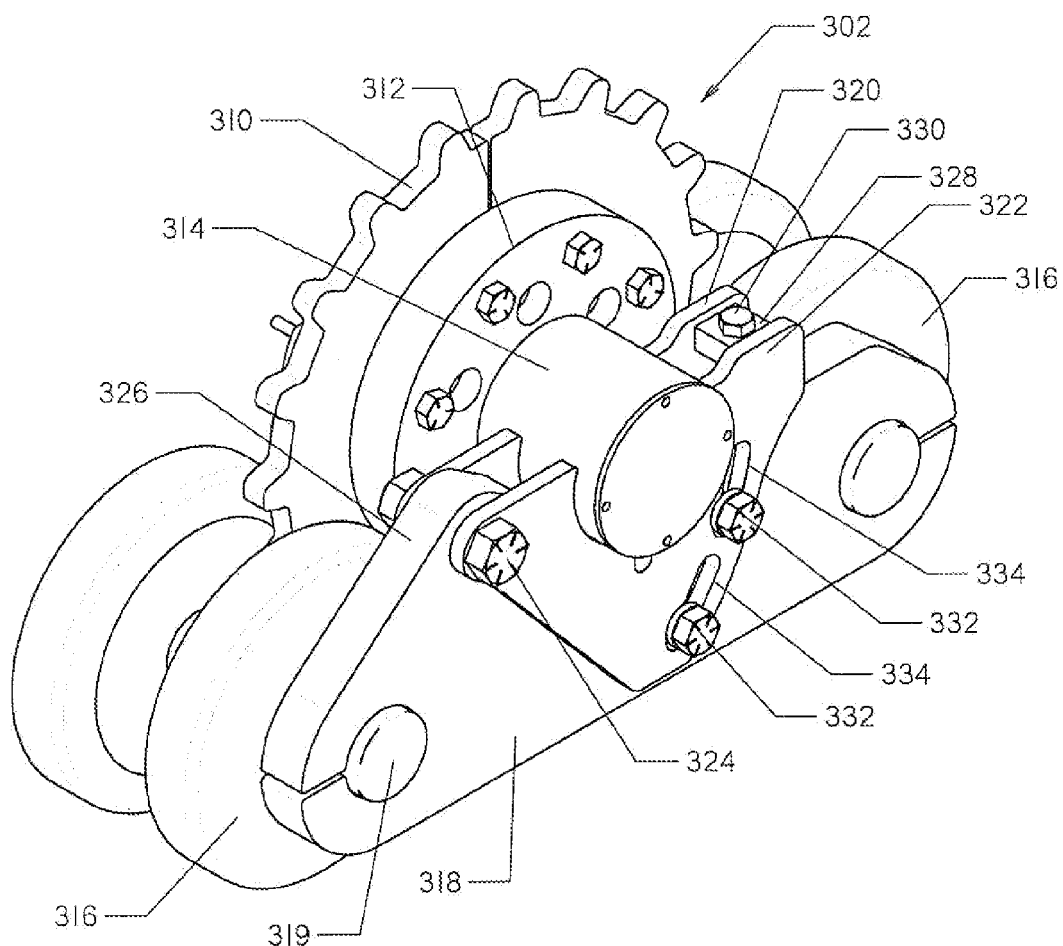
FIG. 14 is a partial perspective view of the system shown in FIG. 13 without the track.
Figure 15:
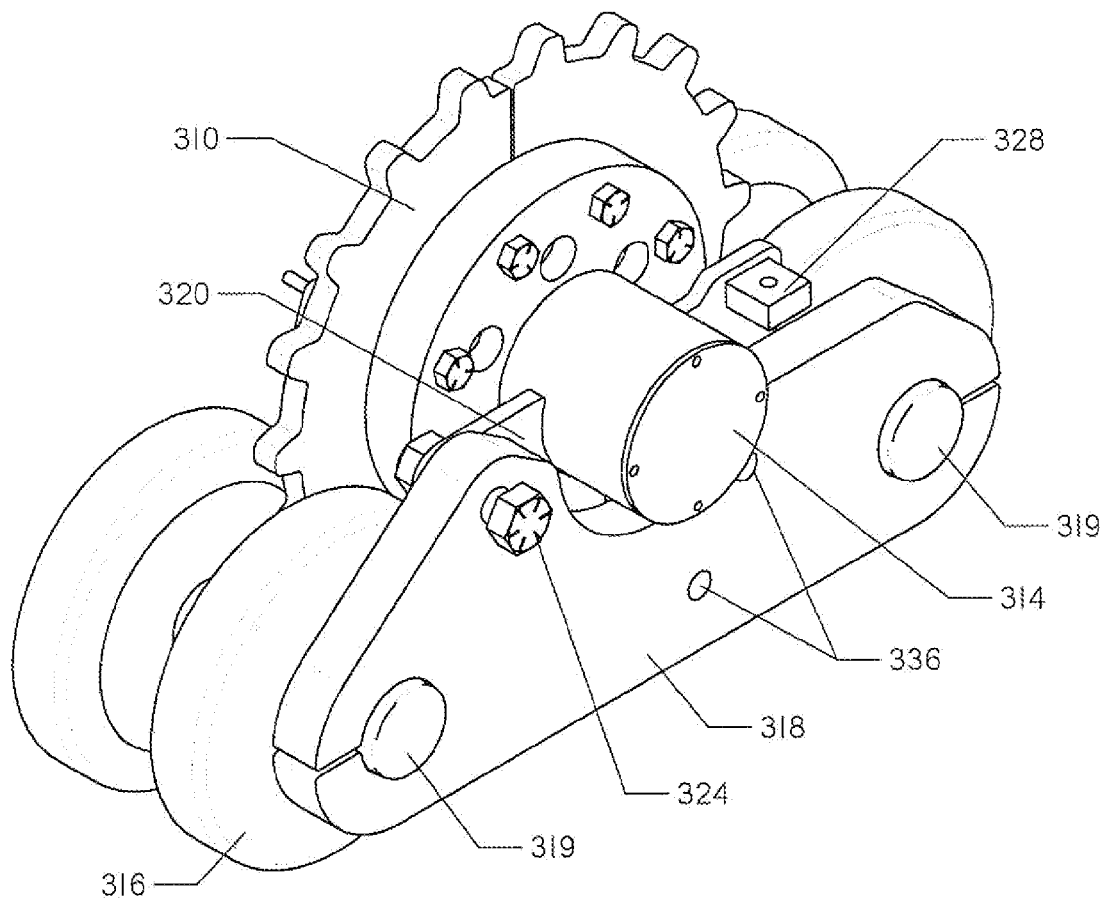
FIG. 15 is a partial perspective view of the system shown in FIG. 14 without the outside adjustment plate.

Referring now to FIG. 14, the sprocket assembly 302 comprises a sprocket 310, a flange 312, and a bearing housing 314. The sprocket 310 is secured to the flange 312 which in turn is operatively connected to the bearing housing 314. The flange 312 provides for connection to the motor and axle (not show) of a construction machine that drives rotation of the sprocket 310.

The roller assembly 304 comprises a plurality of rollers 316 and a roller frame 318. Preferably, two rollers 316 are used and more preferably two sets of two rollers 316 are used. The two sets rollers 316 are supported at opposite ends of the frame 318 by spindles 319 that allow for free rotation of the rollers. The frame 318 and rollers 316 are preferably sized to allow the sprocket 310 to be operative in the separation between the sets of rollers 316.

The tension adjustment assembly 308 comprises a first adjustment plate 320 and a second adjustment plate 322. The plates 320 and 322 are each secured to the bearing housing 314 separated by a distance substantially equal to a width of the frame 318. The plates 320 and 322 are connected by a pivot pin or bolt 324 that also passes through a pivot point portion 326 of the frame 318. Preferably, the pivot point 326 and the pivot point bolt 324 are positioned laterally adjacent to the bearing housing 314. An adjustment nut 328 is disposed between the plates 320 and 322, preferably at a tension point substantially opposite from the pivot point bolt 324. A tension bolt 330 is threaded through the nut 328 such that an end of the bolt contacts a portion of the frame 318 adjacent the housing 314 and opposite from the pivot point 326. One skilled in the art will appreciate that as the tension bolt 330 is adjusted in the nut 328, a substantially vertical distance between the sprocket 310 and the rollers 316 proximate the bolt will change, effectively adjusting the tension in the track 306.

When the desired tension in the track 306 is achieved, the tension plates 320 and 322 can be secured to the frame 318 with a plurality of clamping bolts 332. Preferably, two clamping bolts 332 are used and pass through clamping slots 334 formed in the outer or second plate 322. One skilled in the art will appreciate the slots 334 may be slightly arcuate in shape to allow for the pivoting nature of the plates 320 and 322. The bolts 332 secure plates 320 and 322 to the frame 318, by passing through the plate 322, through holes 336 in the frame 318, and through the plate 320, and are secured with a nut (not shown) on the back of the plate 320. As tension on the track 306 needs to be adjusted, the clamping bolts 332 can be loosened and the tension adjustment bolt 330 can be adjusted until tension on the track is as desired.

Figure 16:
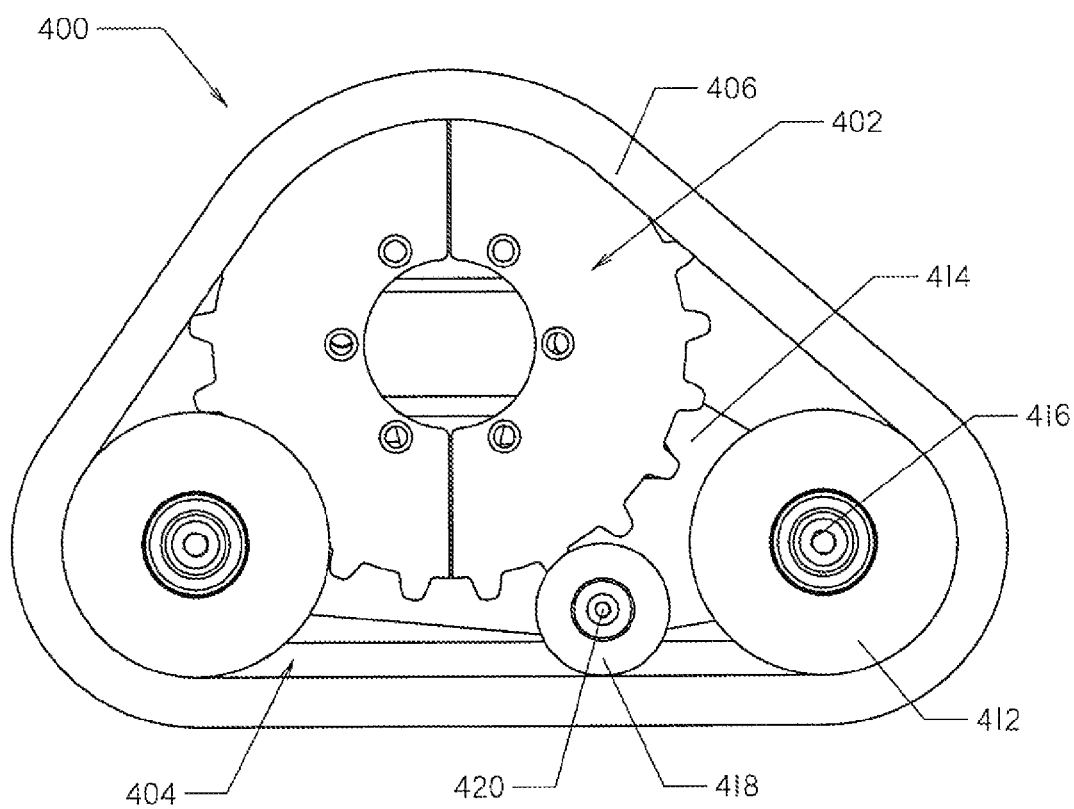
FIG. 16 is a plan view of an alternative embodiment for a track system with a pivoting tension adjustment assembly.

With reference now to FIG. 16, shown therein is an alternative embodiment of a tensioning system for use with tracks connected by a full axle such that the tracks are not adapted to be steered. In such a case, one skilled in the art will appreciate that the tensioning system can be on the inside of the track and under the construction machine. Such an arrangement is different from the embodiments shown if FIGS. 1-15, where the tensioning assemblies were disposed on the outside of the tracks. The track system 400 is shown from the outside or front in FIG. 16, and comprises a sprocket assembly 402, a roller assembly 404, and a track 406. The track 406 is disposed around the sprocket assembly 402 and the roller assembly 404 in a generally triangular shape. A tension adjustment assembly 408 (shown in FIG. 17) serves to move the sprocket assembly 402 substantially vertically relative to the roller assembly 404, effectively adjusting a level of tension in the track 406.

Figure 17:
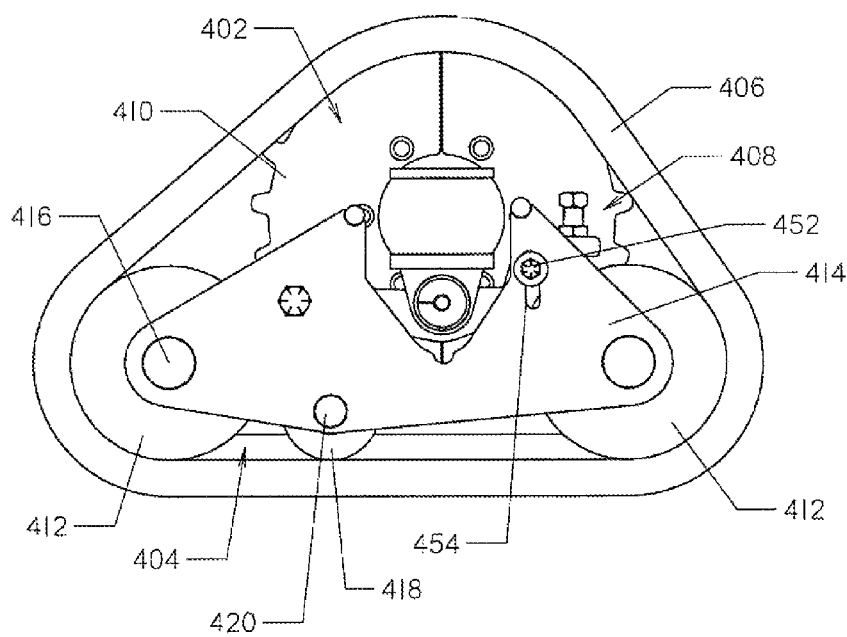
FIG. 17 is a back side plan view of the system shown in FIG. 16.

Referring now to FIG. 17, the track system 400 is shown from the back or under the machine (not shown). The sprocket assembly 402 of the present embodiment comprises a sprocket 410. The sprocket 410 is operatively connected to the axle (not shown) that drives rotation of the sprocket. The roller assembly 404 comprises a plurality of rollers 412 and a roller frame 414. Preferably, two rollers 412 are used and more preferably two sets of two rollers are used. The two sets rollers 412 are supported at opposite ends of and adjacent the frame 414 by spindles 416 that allow for free rotation of the rollers. Additional intermediate rollers 418 and associated spindles 420 may be disposed proximate a bottom of the frame 414 and in between the sets of rollers 412. The frame 414 and rollers 412 are preferably sized to allow the sprocket 410 to be operative in the separation between the sets of rollers 412.

Figure 18:
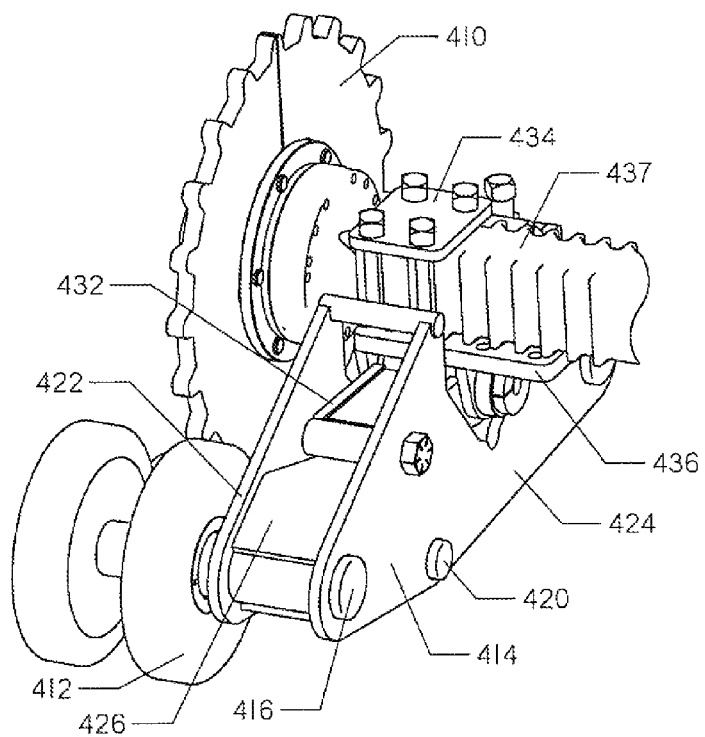
FIG. 18 is a partial perspective view of the system shown in FIG. 17 without the track.
Figure 19:
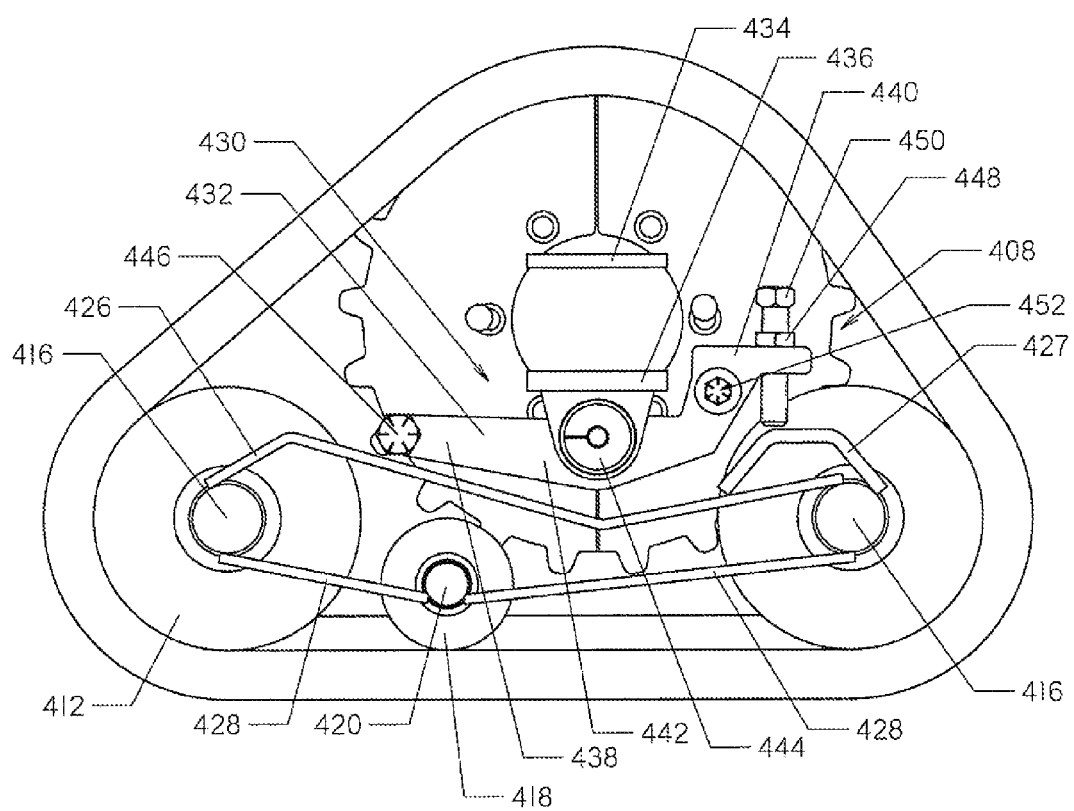
FIG. 19 is a partial plan view of system shown in FIG. 17 without the side plates.

With reference now to FIGS. 18 and 19, the frame 414 comprises a first side plate 422 proximate the rollers 412 and a second side plate 424 parallel to and separated from the first plate. A top support plate 426 is provided between the plates 422 and 424, and secured between the spindles 416 (as shown in FIG. 19, where the side plates are removed). An adjustment plate 427 is secured to the top support plate 426 for use with the tension adjustment assembly 408 in a manner yet to be described. Additional bottom support plates 428 are disposed between the plates 422 and 424, and connected to the spindles 416 and intermediate spindles 420.

The tension adjustment assembly 408 is disposed between the plates 422 and 424, above the top support plate 426. The adjustment assembly 408 comprises a mounting assembly 430 and an adjustment arm 432. The mounting assembly 430 comprises a top plate 434 and a bottom plate 436 for mounting to the axle housing 437. Preferably the plates 434 and 436 are secured to the axle housing using a plurality of bolts.

The adjustment arm 432 has a first end 438, a second end 440, and a middle portion 442. The middle portion 442 of the adjustment arm 432 is secured to the bottom plate 436 at an arm mount 444. The adjustment arm 430 is pivotally connected to the plates 422 and 424 with a pivot bolt 446 proximate the first end 438 of the arm. An adjustment nut 448 is secured to the second end 440 of the adjustment aim 432. A tension bolt 450 is threaded through the nut 448 such that an end of the bolt contacts the adjustment plate 427 of the frame 414. One skilled in the art will appreciate that as the tension bolt 450 is adjusted in the nut 448, a substantially vertical distance between the sprocket 410 and the rollers 412 proximate the bolt will change, effectively adjusting the tension in the track 406.

When the desired tension in the track 406 is achieved, the adjustment arm 432 can be secured to the frame 414 with a clamping bolt 452. The clamping bolt 452 passes through a clamping slot 454 formed in both plates 422 and 424 of the frame 414. One skilled in the art will appreciate the slot 454 may be slightly arcuate in shape to allow for the pivoting nature of the plate 424. The bolt 452 is secured to the adjustment arm 432 by clamping plates 422 and 424 using a nut not shown) on the back side of plate 422. As tension on the track 406 needs to be adjusted, the clamping bolt 452 can be loosened and the tension adjustment bolt 450 can be adjusted until tension on the track is as desired.

Various modifications can be made in the design and operation of the present invention without departing from the spirit thereof. For example, certain work tools or accessories could be attached to the base unit 12 thus providing a work tool on both ends of the tool carrier 10. Additionally the equipment as described herein could be a combination of work tools. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A track system for a tracked vehicle, the system comprising:
   a sprocket assembly comprising:
      a bearing assembly;
      a sprocket rotatably attached to the bearing assembly; and
   a roller assembly comprising:
      a roller trolley comprising a frame; and
      a plurality of rollers rotatably supported on the trolley;
   a track disposed around the sprocket and the plurality of rollers; and
   a tension adjustment assembly comprising:
      a first plate secured to the bearing assembly
      an adjustment nut secured to a top of the plate adjacent the bearing assembly; and
      an adjustment bolt adapted to be threaded through the adjustment nut such that a threaded end of the bolt contacts the frame; and
      wherein the first plate is pivotally secured to the frame at a pivot point adjacent the bearing assembly and opposite from the adjustment nut;
      wherein the tension adjustment assembly is adapted to move the sprocket assembly relative to the roller assembly in a substantially vertical direction.

2. The system of claim 1 wherein the roller trolley comprises a substantially vertical roller support, the support defining at least one clamp opening; and
   wherein the tension adjustment assembly comprises
      a tension base plate secured to the roller support;
      a tension adjustor plate having at least one internally threaded bore, the plate secured to the bearing assembly and positioned adjacent the roller support;
      an adjustment nut secured to a top of the adjustor plate;
      an adjustment bolt adapted to be threaded through the adjustment nut such that a threaded end of the bolt contacts the tension base plate;
      at least one clamping bolt adapted to secure the roller support to the adjustor plate.

3. The system of claim 1 wherein the adjustment assembly further comprises a second plate secured to the bearing assembly such that the frame of the roller assembly is positioned between the first plate and the second plate.

4. The system of claim 1 wherein the adjustment assembly further comprises a plurality of clamping bolts, the bolts adapted to secure the plates to the frame.

5. The system of claim 4 wherein the clamping bolts pass through the second plate, the frame, and the first plate and are threaded to a clamping nut.

6. A track system for a tracked vehicle, the system comprising:
   a sprocket assembly comprising:
      a rotatable sprocket; and
   a roller assembly comprising:
      a frame; and
      a plurality of rollers rotatably supported on the frame;
   a track disposed around the sprocket and the plurality of rollers; and
   a tension adjustment assembly adapted to move the sprocket assembly relative to the roller assembly in a substantially vertical direction, wherein the tension adjustment assembly comprises a mounting assembly adapted to secure the tension adjustment assembly to an axle housing of the tracked vehicle and an adjustment arm secured to the mounting assembly and pivotally connected to the frame at a first end of the adjustment arm.

7. The system of claim 6 wherein the frame comprises an adjustment plate; and
   wherein the tension adjustment assembly comprises:
      an adjustment nut secured to a second end of the adjustment arm; and
      an adjustment bolt adapted to be threaded through the adjustment nut; and
   wherein a threaded end of the adjustment bolt contacts the adjustment plate of the frame.

8. The system of claim 7 wherein the frame comprises two parallel plates, such that the adjust plate is disposed between the two parallel plates; and
   wherein the adjustment arm is disposed substantially between the two parallel plates of the frame such that the second end of the arm is positioned above the adjustment plate.

9. A method for adjusting tension in a track of a tracked vehicle, the method comprising the steps of:
   moving a sprocket in a substantially vertical direction relative to a plurality of rollers; and
   securing the sprocket relative to the rollers by clamping the sprocket relative to the rollers.

10. The method of claim 9 wherein the step of moving the sprocket comprises threading a bolt through a nut secured to the sprocket such that a threaded end of the bolt contacts the rollers.

\* \* \* \* \*